(12) United States Patent
Colley et al.

(10) Patent No.: US 7,756,639 B2
(45) Date of Patent: Jul. 13, 2010

(54) SYSTEM AND METHOD FOR AUGMENTING A SATELLITE-BASED NAVIGATION SOLUTION

(75) Inventors: Jaime B. Colley, Laguna Niguel, CA (US); Lars Boeryd, Rancho Santa Margarita, CA (US)

(73) Assignee: SiRF Technology, Inc., San Jose, CA (US)

( * ) Notice: Subject to any disclaimer, the term of this patent is extended or adjusted under 35 U.S.C. 154(b) by 1235 days.

(21) Appl. No.: 10/959,288

(22) Filed: Oct. 5, 2004

(65) Prior Publication Data

US 2009/0326809 A1    Dec. 31, 2009

Related U.S. Application Data

(60) Provisional application No. 60/509,163, filed on Oct. 6, 2003, provisional application No. 60/509,186, filed on Oct. 6, 2003.

(51) Int. Cl.
 *G01C 21/00* (2006.01)
(52) U.S. Cl. ..................................................... 701/213
(58) Field of Classification Search .................. 701/214, 701/216, 210
See application file for complete search history.

(56) References Cited

U.S. PATENT DOCUMENTS

| | | | |
|---|---|---|---|
| 5,394,333 A | 2/1995 | Kao | |
| 5,488,559 A | 1/1996 | Seymour | |
| 2001/0024172 A1* | 9/2001 | Ito et al. | 342/357.02 |
| 2002/0062193 A1* | 5/2002 | Lin | 701/208 |
| 2002/0128775 A1* | 9/2002 | Brodie et al. | 701/216 |
| 2002/0193940 A1* | 12/2002 | Hashida | 701/207 |

FOREIGN PATENT DOCUMENTS

| | | |
|---|---|---|
| EP | 1006367 A2 | 6/2000 |
| WO | 00/50917 A1 | 8/2000 |

OTHER PUBLICATIONS

EP04 821 295.5 Summons of Jun. 10, 2009.

\* cited by examiner

*Primary Examiner*—Khoi Tran
*Assistant Examiner*—Nicholas Kiswanto
(74) *Attorney, Agent, or Firm*—Haynes and Boone, LLP

(57) ABSTRACT

A map-matching feedback interface uses added information to bound a mapping solution and calibrate a navigation system, thus enabling the navigation system to navigate more accurately over a longer period of time. The system recognizes erroneous measurements and reduces or eliminates them from the mapping solution, thus preventing position inaccuracies. The system interfaces the navigation system with a mapping system that feeds back map-based data to the navigation system and combines the map-matching feedback data with other sensor data to produce an accurate navigation solution even in environments where GPS or dead reckoning input data is inaccurate.

20 Claims, 10 Drawing Sheets

SYSTEM AND METHOD FOR AUGMENTING A SATELLITE-BASED NAVIGATION SOLUTION

PRIORITY CLAIM

This application is a non-provisional application claiming benefit of priority under 35 U.S.C. 119(e) of U.S. Provisional Patent Application Ser. No. 60/509,163, filed Oct. 6, 2003, entitled "Distributed GPS/DR Navigation System," by Jaime B. Colley and Lars Boeryd, and U.S. Provisional Patent Application Ser. No. 60/509,186, filed Oct. 6, 2003, entitled "Integrated GPS and Map-Matching Navigation System," by Jaime B. Colley and Lars Boeryd, both of which are incorporated herein by reference in their entirety.

CROSS REFERENCE TO RELATED APPLICATION

This application is related to copending U.S. patent application Ser. No. 10/959,497, filed concurrently herewith, entitled "Method and System for a Data Interface for Aiding a Satellite Positioning System Receiver," by Jaime B. Colley and Lars Boeryd, which is incorporated by reference herein in its entirety.

FIELD OF THE INVENTION

The present invention generally relates to satellite-based navigation systems used in conjunction with map-matching to provide a navigation solution comprising position, speed, and heading. More specifically, the present invention pertains to a satellite-based navigation system, which uses map-matching feedback data to bound the navigation solution and to calibrate the navigation system, thus enabling the navigation system to navigate more accurately over a longer period of time.

BACKGROUND OF THE INVENTION

Although the present invention is described with specific reference to the Global Positioning System (GPS) as an example of a satellite-based positioning and navigation system, it should be understood that this is only a specific example that does not limit the scope of the invention and that other positioning or navigational systems may be used.

The global positioning system (GPS) is currently used by many applications to determine the location of a receiver. GPS provides specially coded satellite signals that can be processed in a GPS receiver, enabling the GPS receiver to compute position, speed, and heading. Four GPS satellite signals are used to compute positions in three dimensions and a time offset in a receiver clock.

The GPS receiver determines location by using triangulation; triangulation requires a location of at least four satellites and the distances from the receiver to each of those four satellites. The GPS receiver determines the locations of the satellites and the distances by analyzing the specially coded satellite signals that are high frequency, low-power radio signals.

In a poor signal-reception environment, such as, for example, "urban canyons", one or more satellite signals may be blocked or distorted, to the point where there may not be enough measurements with which to formulate a navigation solution. Dead reckoning (DR) has been used to supplement GPS in poor signal-reception environments. In dead reckoning, if the vehicle or platform starts a trip from a known location, the distance and direction from the known location can be used to determine the current location of the vehicle. In the terrestrial environment, such as for automobiles, ships, boats, and aircraft, dead reckoning uses such simple "inertial navigation" sensors such as, for example, an odometer sensor and a vibrational gyroscope. Typical inertial navigation sensors suffer from error accumulation. For example, a gyro bias error can cause a gyroscope to output a non-zero value even if the angular velocity is zero. Gyro bias is observable when the vehicle is not moving or when it is moving in a straight line.

Both GPS and DR suffer from limitations, for example, the GPS signal may not be available in obstructed areas such as urban canyons or tunnels while the DR system can drift over time and accumulate errors. However, the integration of GPS and DR yields a positioning system that is superior to either GPS or DR alone. The two systems are integrated in such a way that the GPS subsystem inputs control the drift and error accumulation of the DR subsystem, and the DR subsystem becomes the main positioning system during GPS outages. The result is an integrated system that is superior to either alone.

The current state-of-the-art vehicle navigation systems have integrated GPS and DR with a digital road map, frequently with user friendly and ergonomic enhancements. This integration of GPS with digital mapping, supplemented by DR, is especially useful in urban canyons and tunnels. These navigation systems may provide "turn-by-turn" instructions to a driver. The "turn-by-turn" travel times are determined by approximating real-time position information augmented by re-routing if the driver misses a turn.

In these integrated navigation systems, the GPS is typically used to periodically correct gross positioning errors in the overall system position solution. The position solution is generally derived from an integration of a map-matching system and a DR system in which the DR system is calibrated by matching the actual DR path to map street patterns.

Although this technology has proven to be useful, it would be desirable to present additional improvements. There are several drawbacks to conventional navigation systems. Conventional pattern-matching algorithm used to calibrate the DR sensors in navigation systems tend to be sophisticated, heuristic, and very complex, requiring a large amount of processing resources.

In addition, significant GPS sub-system position inaccuracies may be present in the urban canyon environment, requiring yet another set of non-trivial, complex heuristics. The navigation system thus is required to frequently examine the relative quality of different navigation data sources, and to ultimately adjudicate which data source provides the output navigation state (for example, position, speed, and heading).

Furthermore, the complexity of a map-matching problem in a conventional navigation system generally requires the use of severe filtering that introduces a perceivable lag between the actual position and the solution of the system. Consequently, the system may not "recognize" that it has turned a corner until many seconds after the fact. This makes turn-by-turn navigation difficult to manage.

Thus, in conventional navigation systems, the GPS function is used to correct gross navigation errors. However, in the urban canyon environment, stand-alone GPS may not be available to provide this correcting function. In addition, DR sensors used in conventional navigation systems have errors that grow over time. It is then to be expected that in the urban canyon environment, the conventional navigation systems, which rely on the combination of DR and map-matching, have errors in position and heading that accumulate to the point where turn-by-turn navigation becomes unreliable.

What is therefore needed is a system and an associated method for a augmenting a satellite-based navigation system that comprises a location determination system integrating map-matching with a position indicating and direction indicating navigation system, such as stand-alone GPS or combined GPS and DR, such that the output navigation parameters are consistent with turn-by-turn navigation in all the navigation environments in which a vehicle, a platform, or a SPS receiver might operate. The need for such a solution has heretofore remained unsatisfied.

SUMMARY OF THE INVENTION

The present invention satisfies this need, and presents a system and an associated method (collectively referred to herein as "the system" or "the present system") for augmenting a satellite-based navigation system. The present system navigates in environments of insufficient, or deteriorated, GPS information, re-establishing a base line or initial point from which a navigation system may navigate the user. The present system comprises a map-matching feedback interface that uses added information to bound the position solution and calibrate the navigation system, thus enabling the navigation system to navigate more accurately over a longer period of time.

The present system utilizes a map-matching feedback interface to add map data information in a way that augments the overall performance of the navigation system. The present system recognizes erroneous measurements such as, for example, GPS or DR measurements and eliminates them from a solution used by the navigation system to determine position and heading of the GPS receiver, thus preventing position inaccuracies that can be encountered in, for example, the urban canyon environment.

The present system utilizes a navigation system comprised of a position and heading sensor such as a GPS system. The present system interfaces the navigation system with a mapping system comprised of a map database and map-matching algorithm. The present system feeds back the map-based data to the navigation system and combines the map-matching feedback data with other sensor data to produce an accurate navigation solution even in environments where GPS or dead reckoning input data is inaccurate.

A mapping system provides mapping data to the present system comprising, for example, a map-matched position, a map-matched heading, a road direction, a road width, a road radius of curvature, a road grade, road speed limits, road traffic control points, road intersections, terrain and blockage areas adjacent to a road, and foliage areas adjacent to the road. The mapping data determined by the mapping system after the map-matching operation of the mapping system is fed back to the present system and to the GPS-based navigation system through the present system.

Map-matching feedback data provided by the present system can be used to modify the satellite search and acquisition algorithms based on signal blockage conditions due to surrounding terrain and buildings. Improvements in the accuracy and quality of the solution provided by the navigation system can lead to significant simplification of the overall logic required by conventional map-matching processes.

In one embodiment, the present system can use map-matching feedback data to eliminate an internal dead reckoning navigation process running within the GPS-based navigation system. The map-matching feedback data can be used to update GPS navigation states (positions, headings, etc.), effectively using the map-matching feedback data in place of dead reckoning navigation data. Consequently, the present system can eliminate a need by the navigation system to perform dead reckoning navigation processing.

In another embodiment, the navigation system comprises a GPS system and a dead reckoning system. This embodiment uses map-matching feedback data to augment an internal dead reckoning navigation process running within the GPS-based navigation system. The map-matching feedback data are used to update and correct dead reckoning navigation states.

Using map-matching feedback data in the GPS subsystem allows use of tighter filtering, i.e., smaller filter bounds on the position and heading solution of the navigation system. Tighter filtering results in greater immunity to GPS failures and errors, in turn yielding significant improvements in ground-track fidelity of the navigation system. In a poor signal-reception environment, errors in an output solution based on the map-matching feedback data are typically less than that of a solution based only on GPS data, or on combined GPS and DR data, or on DR data alone.

Overall improvement in accuracy provided by the map-matching feedback data simplifies overall system design of the navigation system. The qualitative improvement in the output solution based on the map-matching feedback data allows elimination of complex map-matching and pattern-matching heuristics. In a conventional navigation system, a complex navigation fusion process is used to produce an output solution; the present system eliminates the need for this navigation fusion process. A method corresponding to the navigation fusion process is performed by the present system in a much less complex, more optimal fashion. Further, conventional navigation systems often incur time delays in producing a navigation solution. The present system eliminates these time delays, providing a navigation system that can quickly produce position and heading solutions in a turn-by-turn timeframe.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Dead Reckoning (DR): a subset of an Inertial Navigation System (INS) in which distance and direction from the known location can be used to determine the current location of a receiver using standard motion sensors such as, for example, an odometer or a vibrational gyroscope.

Global Positioning System (GPS): A system of continually transmitting satellites that enable a GPS receiver to identify earth locations by receiving. GPS provides specially coded satellite signals that can be processed in a GPS receiver, enabling the receiver to compute position, velocity and heading.

Figure 1:
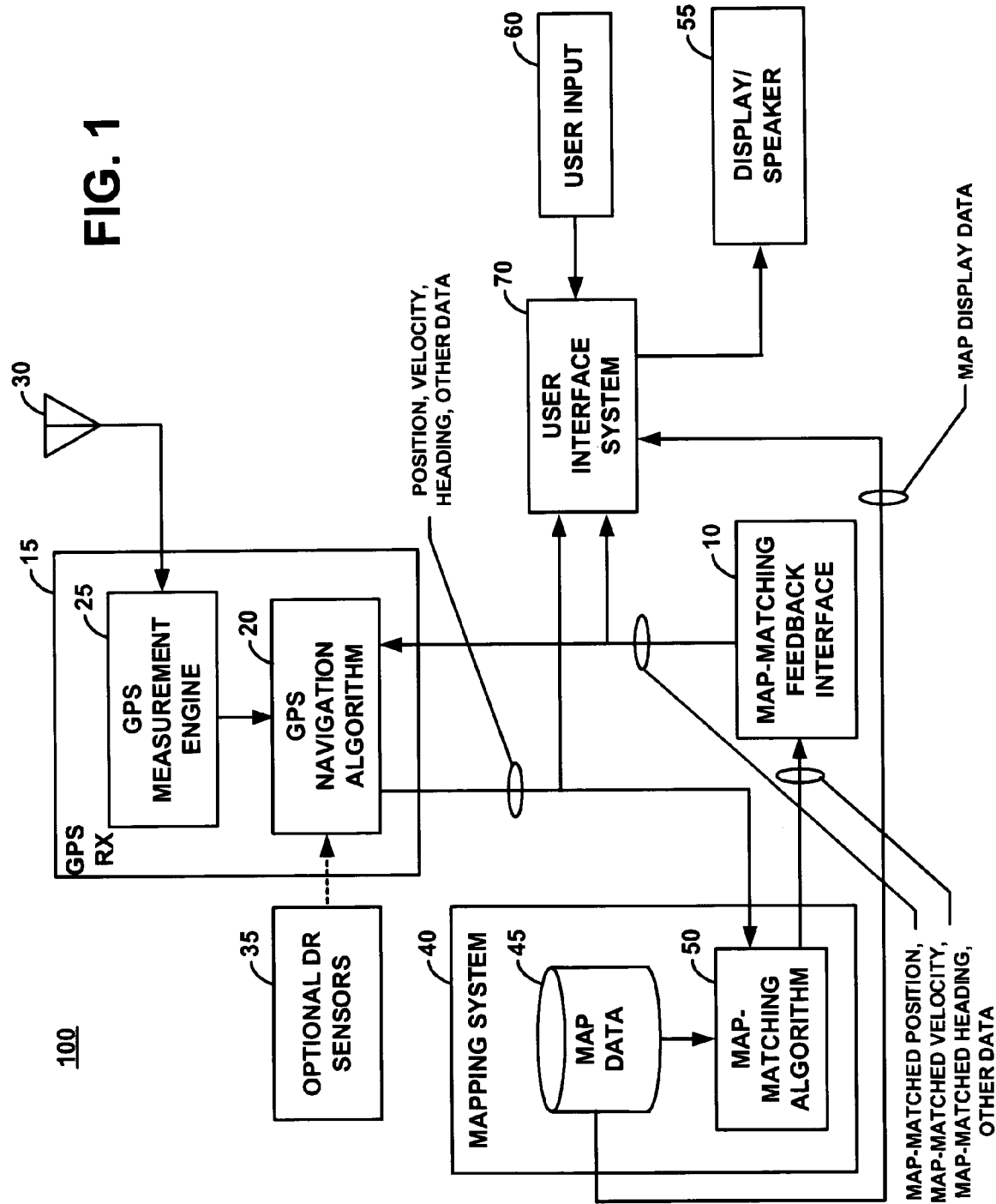
FIG. 1 is a high level schematic illustration of an exemplary navigation system in which a map-matching feedback interface of the present invention can be used.

FIG. 1 illustrates an exemplary high-level architecture of a navigation system 100 comprising a map-matching feedback interface 10 (the "interface" 10 or the MMFB interface 10). The navigation system 100 is mounted on a platform (not shown), any device or mechanism that can carry the navigation system in motion.

The navigation system 100 comprises a GPS receiver (RX) 15. The GPS receiver 15 comprises a GPS navigation algorithm 20 and a GPS measurement engine 25. The GPS receiver 15 calculates position, speed, and heading from one or more sensor inputs and from GPS signals. In the example of FIG. 1, the GPS measurement engine 25 receives the satellite ephemeris, range and range rate data from a GPS antenna 30. In one embodiment, the GPS navigation algorithm 20 receives dead reckoning data from optional dead reckoning (DR) sensors 35. While the navigation system 100 is described for illustration purpose only in relation to the GPS and optionally DR, it should be clear that the invention is applicable as well to, for example, any data source that provides a measurement for position, velocity, or heading. The GPS navigation algorithm 20 produces position, heading, and velocity data from GPS-based measurements (or GPS-based measurements and optional DR based data). The navigation data is provided to a mapping system 40.

The mapping system 40 uses the navigation solution data to produce a mapping solution using such mapping functions as, for example, map data 45 and a map-matching algorithm 50. The mapping solution is produced by the mapping system 40 and provided to the map-matching feedback interface 10.

The map-matching feedback interface 10 feeds the map-matched data, which is based on the navigation data, back to the GPS navigation algorithm 20. The GPS navigation algorithm 20 compares the map-matched data to a series of predetermined time and validity limits, and if it meets the required criteria, the map-matched data is then used to update the GPS navigation algorithm's 20 internal data. The map-matching feedback interface 10 also provides the map-matched solution to the User Interface System 70. The User Interface system 70 can also receive the navigation solution from the GPS navigation algorithm 20, and map display data from the mapping system 40. The User Interface System feeds the navigation and mapping data to the display/speaker 55. A user provides input to the User Interface System 10 via user input 60. Exemplary user inputs include route start and end points, map display style, map zoom and pan commands, etc. In one embodiment, the GPS Receiver 15 and the mapping system 40 can be collocated on the same platform. Alternatively, the GPS receiver 15 and the mapping system 40 can be remotely located.

Figure 2A:
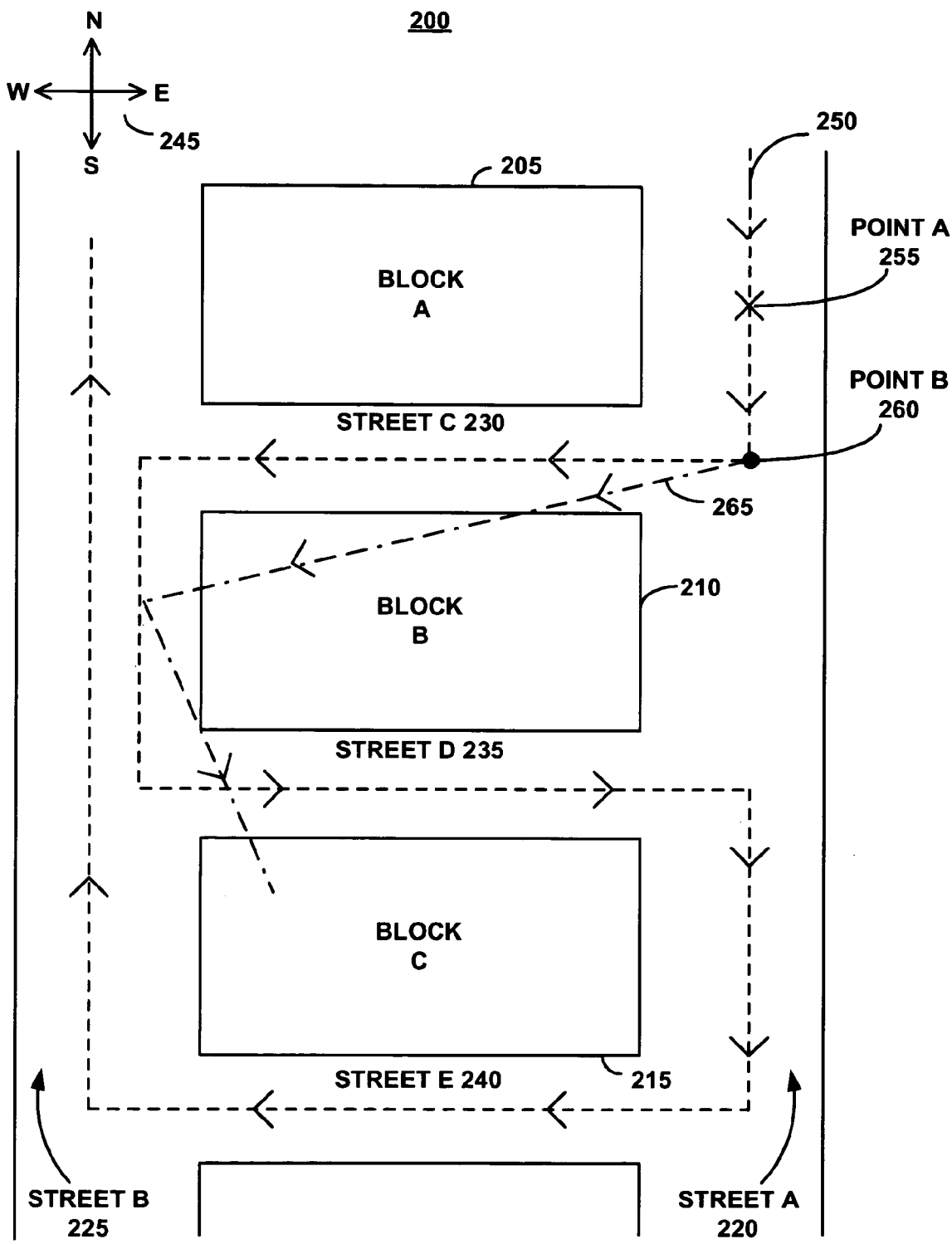
FIG. 2 is comprised of FIGS. 2A and 2B and represents a map illustrating a performance of the map-matching feedback interface of FIG. 1.
Figure 2B:
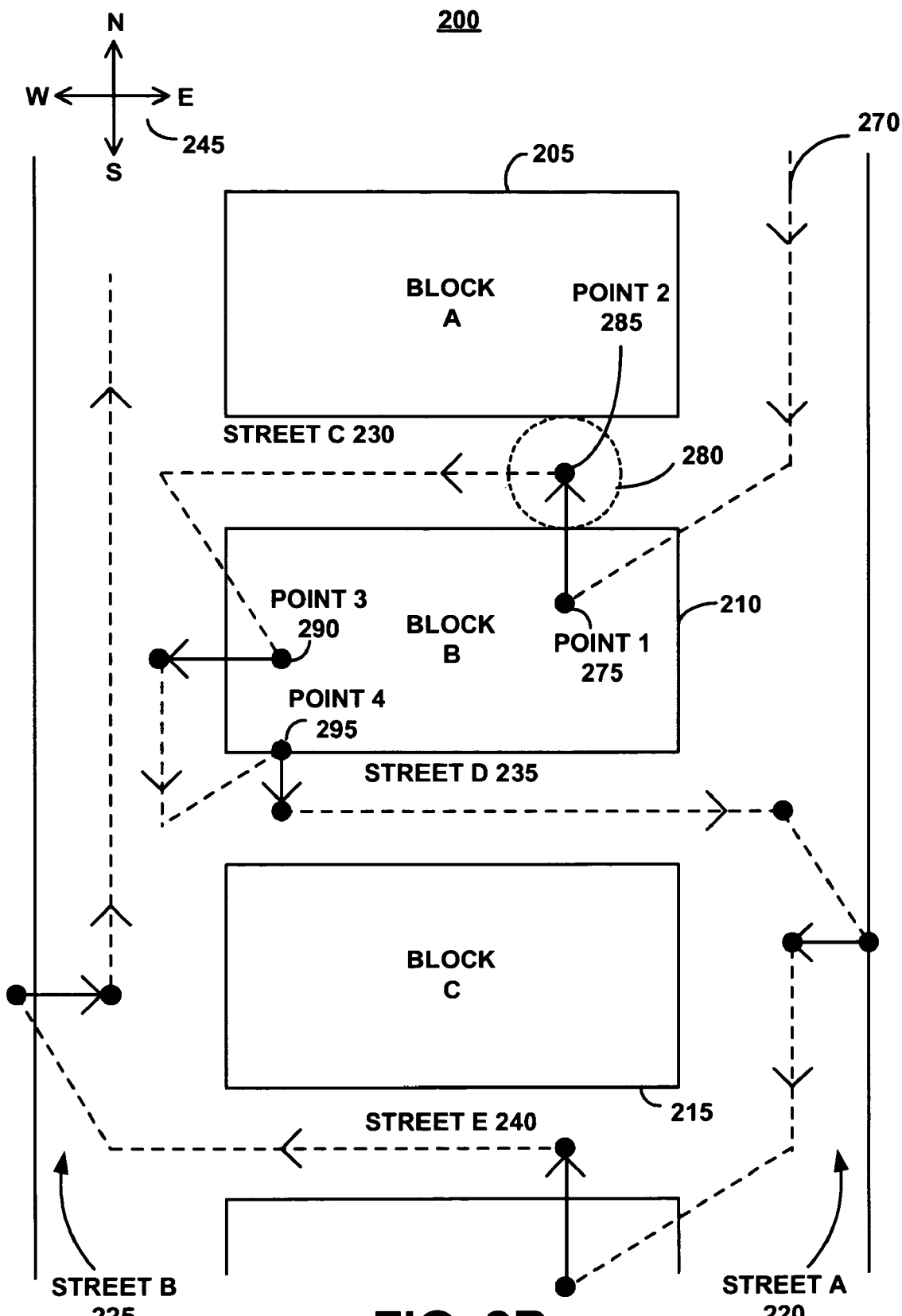

FIG. 2 (FIGS. 2A, 2B) shows a map 200 illustrating a performance of navigation system 100 in providing an accurate navigation solution. For exemplary purposes only, navigation system 100 further comprises optional DR sensors 35; similar results are provided by the map-matching feedback interface 10 for a navigation system 100 comprising only GPS-based navigation.

Map 200 comprises city block A 205, city block B 210, and city block C 215. Map 200 further comprises street A 220, street B 225, street C 230, street D 235, and street E 240. Using standard map directions as illustrated by compass 245, a user is relying on navigation system 100 to follow path A 250 that travels south on street A 220, west on street C 230, south on street B 225, east on street D 235, south on street A 220, west on street E 240, and north on street B 225.

In the example of FIG. 2, the GPS receiver 15 loses contact with one or more GPS satellites at point A 255. At point A 255, accurate GPS data is no longer available. For example, the navigation system may lose the GPS signal such that navigation system 100 is required to rely on DR sensor data to estimate a location and heading for the navigation system 100. Due to, for example, errors in a calibration of the optional DR sensors 35, the navigation solution provided by the navigation system 100 begins to diverge from a true representation of the path of the user at point B, 260, when the user turns a corner. If uncorrected by the map-matching feedback interface 10, the navigation system 100 displays the path of the user as path 265, showing the user moving through buildings in block B, 210.

As shown in FIG. 2B, the map-matching process compares the navigation solution's position and heading data, Point 1, 275, to the street geometry of the Map data 45, and provides an alternative position and heading solution, Point 2, 285, that corresponds to the likeliest location along Street C, 230, obtained from the Map data 45. Point 1, 275, is a navigation solution provided by GPS navigation algorithm 20 from GPS measurements and (optional) DR data, and passed to the mapping system 40 by the map-matching feedback interface 10. In this example, the optional DR sensors 35 have a calibration error such that a 90-degree turn is recorded as a 110-degree turn. The GPS receiver 15 provides an output solution on an exemplary cycle of once every second. In this case, the map-matching algorithm 50 compare the navigation solution, Point 1, 275, to Street C's, 230, geometry, and provide the highest-likelihood position and heading data for a corresponding location, Point 2, 285, on Street C, 230. This map-matched solution is sent back to the GPS navigation algorithm 20 via the map-matching feedback interface 10. If the map-matched data passes the validity checks in the GPS navigation algorithm 20, the GPS navigation algorithm 20 overwrite the erroneous navigation solution, Point 1, 275, with the map-matched solution, Point 2, 285. Consequently, the feedback from the map-matching algorithm 50 is used to re-establish a baseline from which the navigation system 100 navigates, in essence automatically calibrating the navigation system 100.

The map-matched data fed back by the map-matching feedback interface 10 is used in the GPS navigation algorithm 20 to help bound the allowable errors and drift generated by the GPS navigation algorithm 20 and the optional DR sensors 35 within a range of values based on the predetermined vehicle dynamics. If the navigation solution provided by the GPS navigation algorithm 20 falls outside that range, the map-matching feedback solution, provided by the map-matching feedback interface 10, is used to overwrite the erroneous navigation solution. Because each navigation solution depends on a previous navigation solution, errors in navigation solutions quickly compound. Establishing the map-matching Feedback interface 10 allows the GPS navigation algorithm 20 to catch errors in the navigation solution before the errors compound, allowing the use of simple map-matching algorithm 50 to determine the map-matching feedback solution.

Each time the user makes a turn in the example of FIG. 2, the calibration error of the optional DR sensors 35 causes the GPS navigation system 20 to produce an erroneous navigation solution such as, for example, Point 3, 290, and Point 4, 295. As before, the GPS navigation system 20 overwrites the erroneous navigation solution, returning the navigation system 100 to path 270. Consequently, the map-matching feedback interface 10 allows the navigation system 100 to provide accurate turn-by-turn navigation while correcting for drift and errors introduced by navigation sensors.

Figure 3:
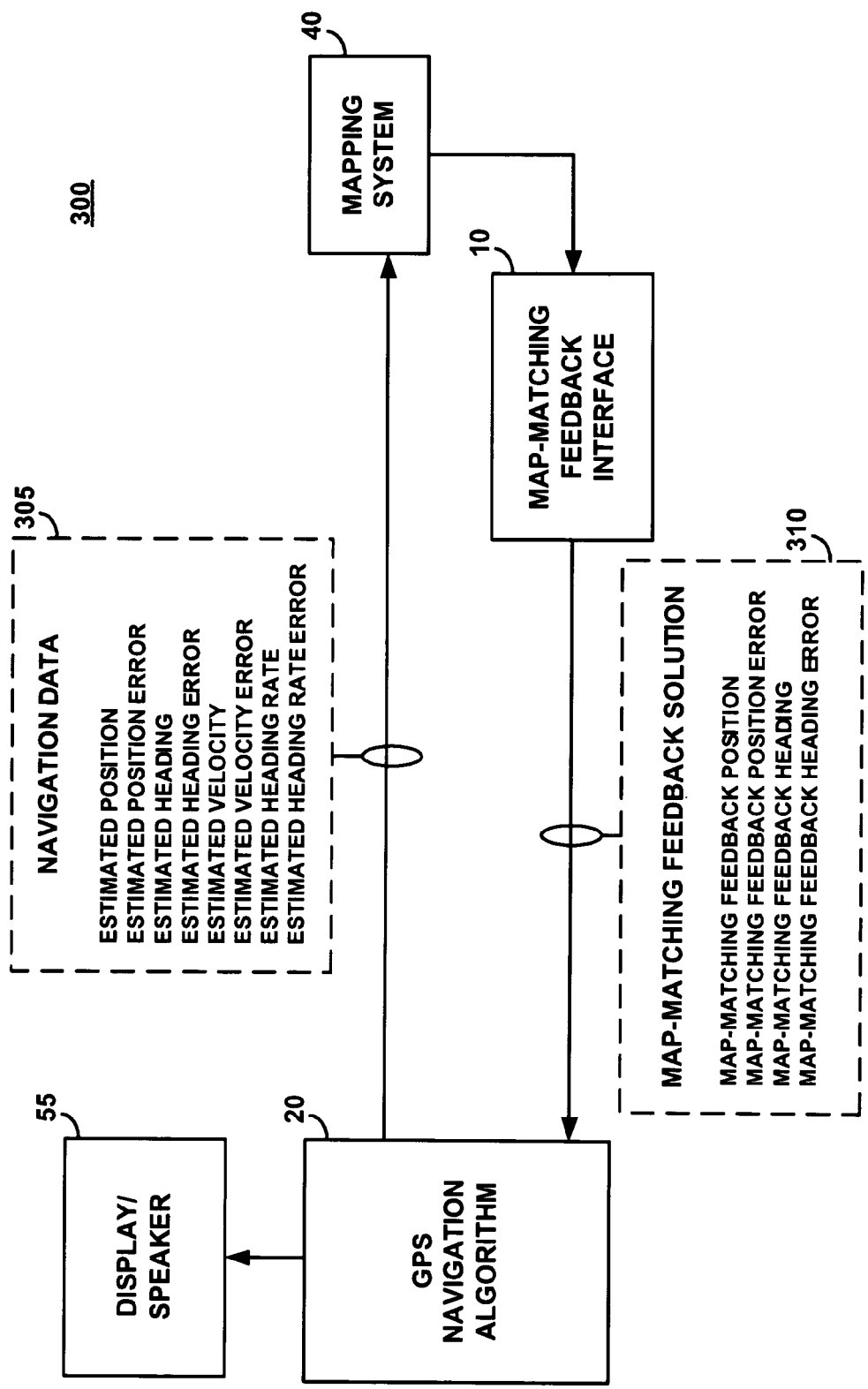
FIG. 3 is block diagram of the navigation system and map-matching feedback interface of FIG. 1 illustrating values transmitted within the navigation system.

FIG. 3 is a block diagram illustrating transfer of data using a standard communication link from the GPS navigation algorithm 20 to the mapping system 40 and from the map-matching feedback interface 10 to the GPS navigation algorithm 20. The GPS navigation algorithm 20 comprises GPS data and optionally comprises DR data from the optional DR sensors 35. Navigation data 305 comprises estimated position, estimated position error, estimated heading, estimated heading error, estimated velocity, estimated velocity error, estimated heading rate, and estimated heading rate error. With further reference to FIG. 1, the mapping system 40 compares the navigation data 305 with map data found in the map data 45, and performs map-matching with the map-matching algorithm 50 to generate a mapping solution. The mapping solution comprises a map-matched position, a map-matched position error, a map-matched heading, and a map-matched heading error.

The map-matching feedback solution 310 comprises a map-matching feedback position, a map-matching feedback position error, a map-matching feedback heading, and a map-matching feedback heading error. The map-matching feedback solution 310 is transmitted to the GPS navigation algorithm 20 by the map-matching feedback interface 10. The GPS navigation algorithm 20 displays the map-matching feedback solution 310 as position and heading on display/speaker 55. The display/speaker 55 can be fed either by the GPS navigation algorithm 20 or map-matching feedback interface 10.

Data is transmitted from the map-matching feedback interface 10 to the GPS navigation algorithm 20 as a single message using the following format:

--- msg header
header checksum
data bytes
    map-matching feedback position
    map-matching feedback position error
    map-matching feedback heading
    map-matching feedback heading error
    map-matching feedback position valid
    map-matching feedback heading valid
data checksum

---

The format of the message can be any format that transmits desired values to the GPS navigation algorithm 20 such as, for example, html, xml, etc.

Figure 4:
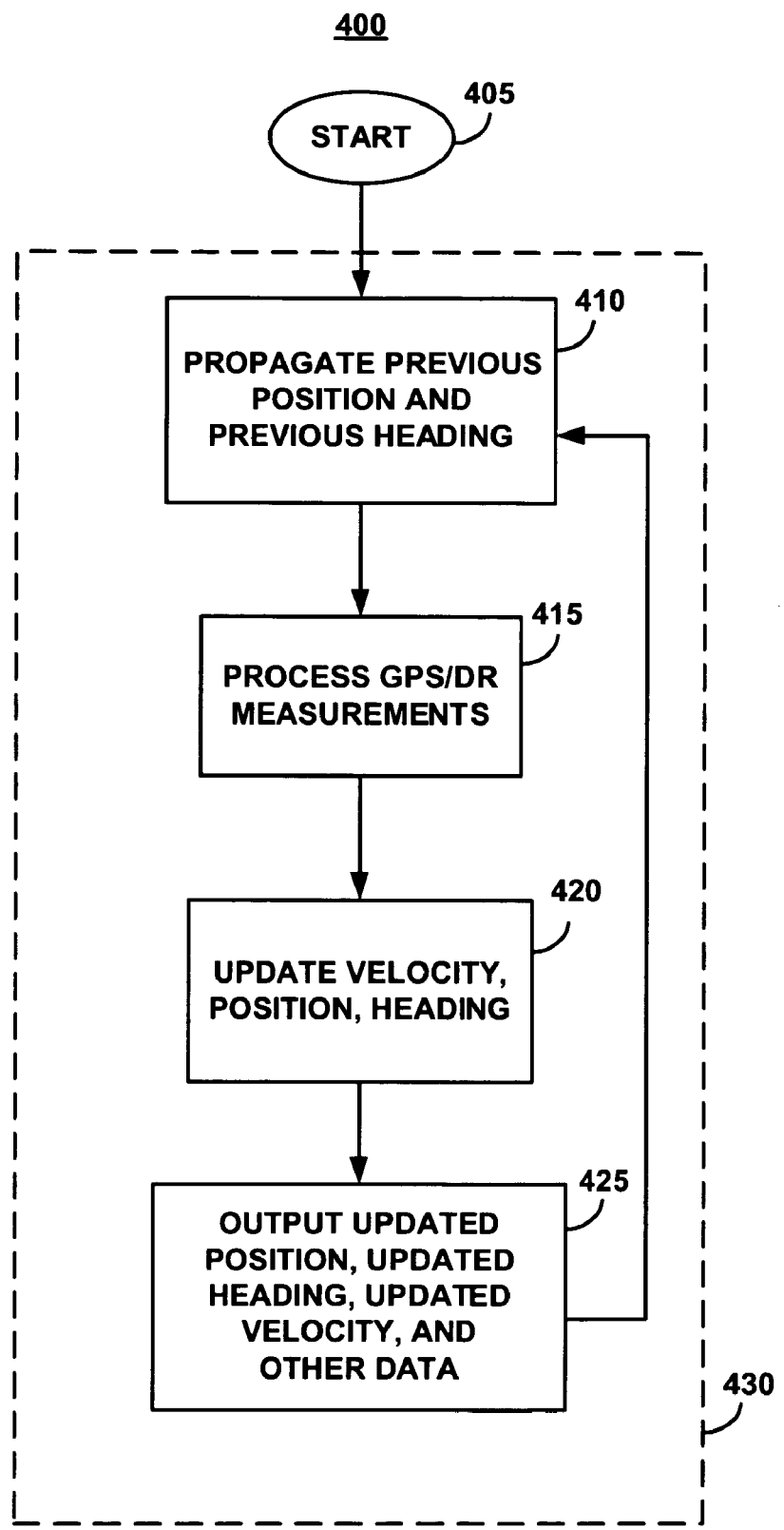
FIG. 4 is a process flow chart illustrating a method of operation of a conventional navigation system.

The process flow chart of FIG. 4 illustrates a method 400 of operation of a conventional navigation system. From start at step 405, the conventional navigation system has a previous position and a previous heading, collectively referenced as a previous state. The conventional navigation system propagates the previous state at step 410. When propagating a previous state, the conventional navigation system determines a new position from the previous position using the previous heading. A conventional navigation system comprising only GPS-based data propagates the new position with the same velocity as the previous state. A conventional system comprising GPS-data and DR data propagates the new position with a new velocity vector.

The conventional navigation system processes GPS/DR measurements at step 415. Step 415 comprises obtaining information such as position, speed, and heading from external sources such as, for example, GPS and DR. The conventional navigation system uses conventional GPS and DR navigation algorithm at step 420 to generate updated values comprising an updated position, an updated position error, an updated heading, an updated heading error, an updated velocity, an updated velocity error, an updated heading rate, and an updated heading rate error. The conventional navigation system outputs the updated values at step 425. Steps 410 through 425 comprise a cycle 430. The updated values generated at step 425 are the previous values used by the conventional navigation system in the next cycle. The conventional navigation system repeats cycle 430 to continually display location and heading as needed to a user.

Figure 5:
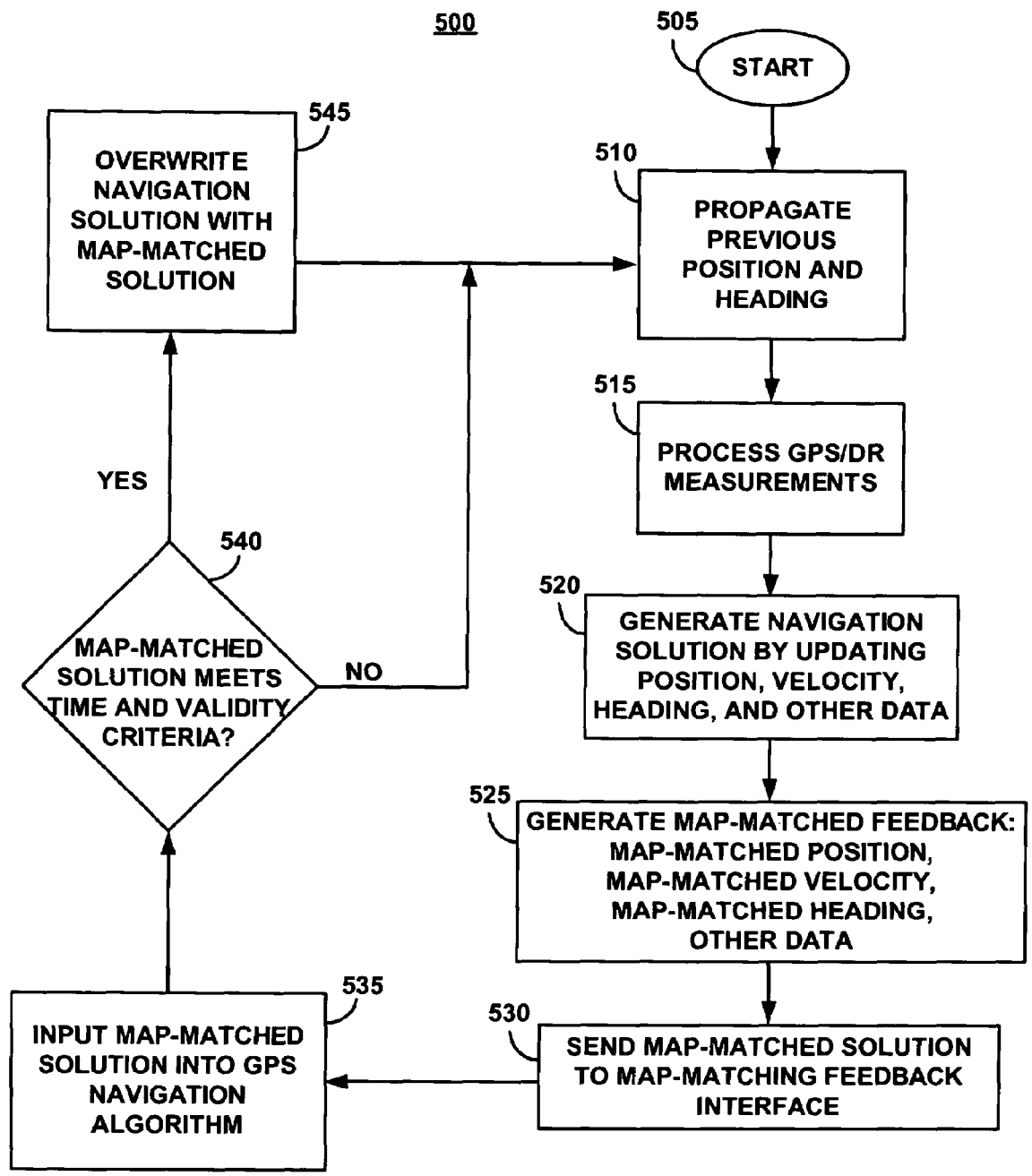
FIG. 5 is a process flow chart illustrating a method of operation of the navigation system and map-matching feedback interface of FIG. 1.

The process flow chart of FIG. 5 illustrates a method 500 of the navigation system 100 with further reference to FIG. 1. The navigation system 100 may perform similarly to the conventional navigation system in steps 505 through 520. From start at step 505, the GPS navigation algorithm 20 has a previous heading and a previous position, collectively referenced as a previous state. The GPS navigation algorithm 20 propagates the previous state at step 510 in a manner that may be similar to that of the conventional navigation system.

The GPS navigation algorithm 20 processes GPS/DR measurements at step 515. Step 515 comprises obtaining information such as velocity, heading, and location from external sources such as, for example, GPS and DR. The GPS navigation algorithm 20 uses the results of the navigation processing in step 515 to update the position, velocity, and heading at step 520. The GPS navigation algorithm 20 outputs the updated navigation solution at step 520. The mapping system 40 may use conventional map-matching at step 525 to generate a mapping solution comprising a map-matched position, a map-matched position error, a map-matched heading, and a map-matched heading error. The mapping system outputs the map-matched solution at step 525.

The mapping system 40 transmits the mapping solution to the map-matching feedback interface 10 at step 530. The GPS navigation algorithm 20 retrieves the map-matched solution data from the map-matching feedback interface 10 at step 535. At decision step 540, the GPS navigation algorithm 20 compares the map-matched solution with the previously propagated state and determines whether the change in position and heading in the map-matched state falls within time and validity limits. In one embodiment, the validity limits are bound by whether the map-matched change in position and heading is physically possible as defined by the predetermined filter bound. For example, the map-matched solution may indicate that the user has moved 100 meters in the North direction in the past second while the updated position error along the North direction indicates that a 100-meter movement is impossible. In this case, the GPS navigation algorithm 20 would reject the map-matched solution as being beyond the filter limit. If conversely, the map-matched solution were to indicate a 20 meter position change while the updated position uncertainty was indicating that a 30 meter position change was possible, then GPS navigation algorithm 20 would accept the map-matched solution as valid, and use it to overwrite the updated navigation solution. The GPS navigation algorithm 20 would then use the map-matched solution in the subsequent propagation at step 510.

If, at decision step 540, the OPS Navigation algorithm 20 determines that the mapping solution falls outside the predetermined filter bound, the GPS Navigation algorithm 20 leaves the updated navigation solution unmodified and uses it in step 510 to perform the position and heading propagation.

Otherwise, the GPS Navigation algorithm 20 determines that the updated navigation solution is in error. The GPS Navigation algorithm 20 then overwrites the updated navigation state with the map-matching feedback solution 310 that accurately reflects the position and heading of the navigation system 100 at step 545. The GPS navigation algorithm 20 uses the map-matching feedback solution 310 in step 510 to propagate the previous state.

Steps 510 through 545 comprise one cycle of the navigation system 100. As an example, a cycle may comprise 1 second such that position and heading of the navigation system 100 are refreshed every second. The duration of the cycle may be any time that allows the navigation system 100 to accurately provide map-matching feedback solutions.

Figure 6:
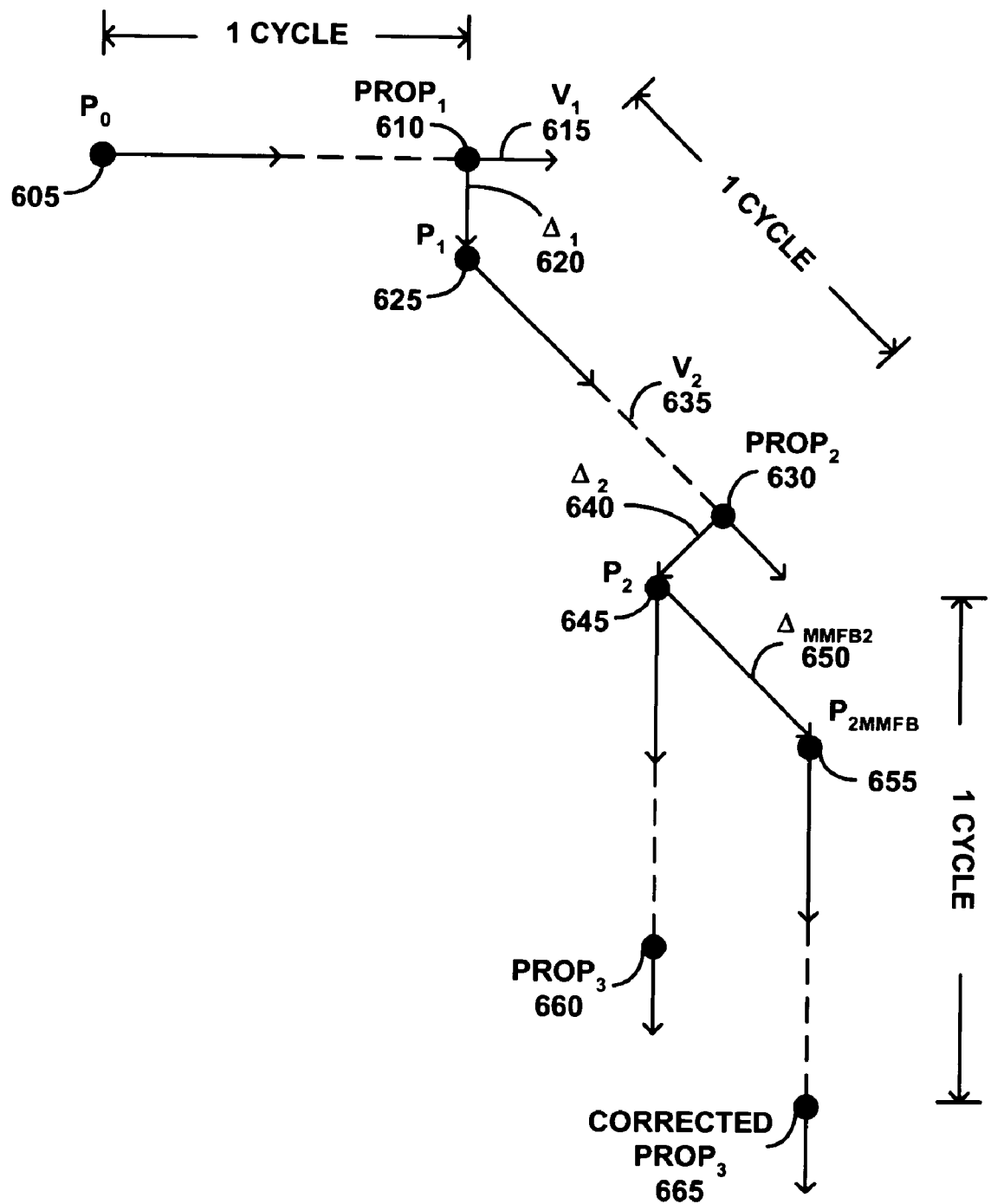
FIG. 6 is a vector diagram illustrating a performance of the navigation system and map-matching feedback interface of FIG. 1.

The vector diagram 600 of FIG. 6 further illustrates the performance of method 500 of the navigation system 100. The navigation system 100 starts method 500 with position $P_0$ 605. The GPS navigation algorithm 20 propagates $P_0$ 605 to prop, 610 (step 510) along vector $V_1$ 615. The GPS navigation algorithm 20 processes sensor data to determine a current state of the navigation system (step 515). GPS navigation algorithm 20 introduces a correcting vector $\Delta_1$ 620, creating the updated navigation solution $P_1$ 625 (step 520). Correcting vector $\Delta_1$ 620 represents a typical position and heading change applied to propagated data as the navigation system 100 navigates a turn.

The mapping system 40 computes a map-matched solution corresponding based on position $P_1$ 625 (step 525) and outputs it to the map-matching feedback interface 10 at step 530 The GPS navigation algorithm 20 retrieves the map-matched solution from the map-matching feedback interface 10 (step 353), determines that the mapping solution is not within the predetermined filter bound (decision step 540), and leaves the updated navigation solution unchanged. The GPS navigation algorithm 20 transmits the updated navigation solution to display/speaker 55 as $P_1$ 625, completes one cycle.

The GPS navigation algorithm 20 propagates $P_1$ 625 to prop$_2$ 630 (step 510) along vector $V_2$ 635. The GPS navigation algorithm 20 processes sensor data to determine a current state of the navigation system (step 515). The GPS navigation algorithm 20 introduces a vector $A_2$ 640, creating the updated navigation solution $P_2$ 645 (step 520). The mapping system 40 computes a map-matched solution 310 based on position $P_2$ 645 (step 525), and passes it to the map-matching feedback interface 10. The GPS navigation algorithm 20 retrieves the map-matched solution 310 from the map-matching feedback interface 10 (step 535), analyzes the mapping solution, and determines that the mapping solution is within the predetermined filter bound (decision step 540). The GPS navigation algorithm 20 overwrites $P_2$ 645 with the map-matched solution 310, which translates the navigation solution to the more correct location, $P_{2MMFB}$ 655. The GPS navigation algorithm 20 transmits the map-matched solution, $P_{2MMFB}$ 655 to display/speaker 55, completing another cycle.

Without correction by map-matching feedback interface 10, the navigation system 100 propagates $P_2$ 645 incorrectly to prop$_3$ 660. Additional errors then accumulate until the navigation system 100 becomes significantly inaccurate, requiring the user to manually reset the navigation system 100. Instead, map-matching feedback interface 10 provides a new baseline value of $P_{2MMFB}$ 655 for the navigation system 100. The navigation system 100 then propagates $P_{2MMFB}$ 655 to corrected prop$_3$ 665 as before. By utilizing map-matching feedback interface 10, the navigation system 100 is able to correct navigation errors incrementally, as the errors occur, continually presenting accurate navigation information to the user on a cyclical basis.

The propagated state generated by the navigation system 100 has an impact on future processes and updates. The filter of GPS navigation algorithm 20 places a predetermined bound on how much a propagated state can change during propagation and provides a correction to keep the change in the propagated state within the predetermined filter bound.

Figure 7:
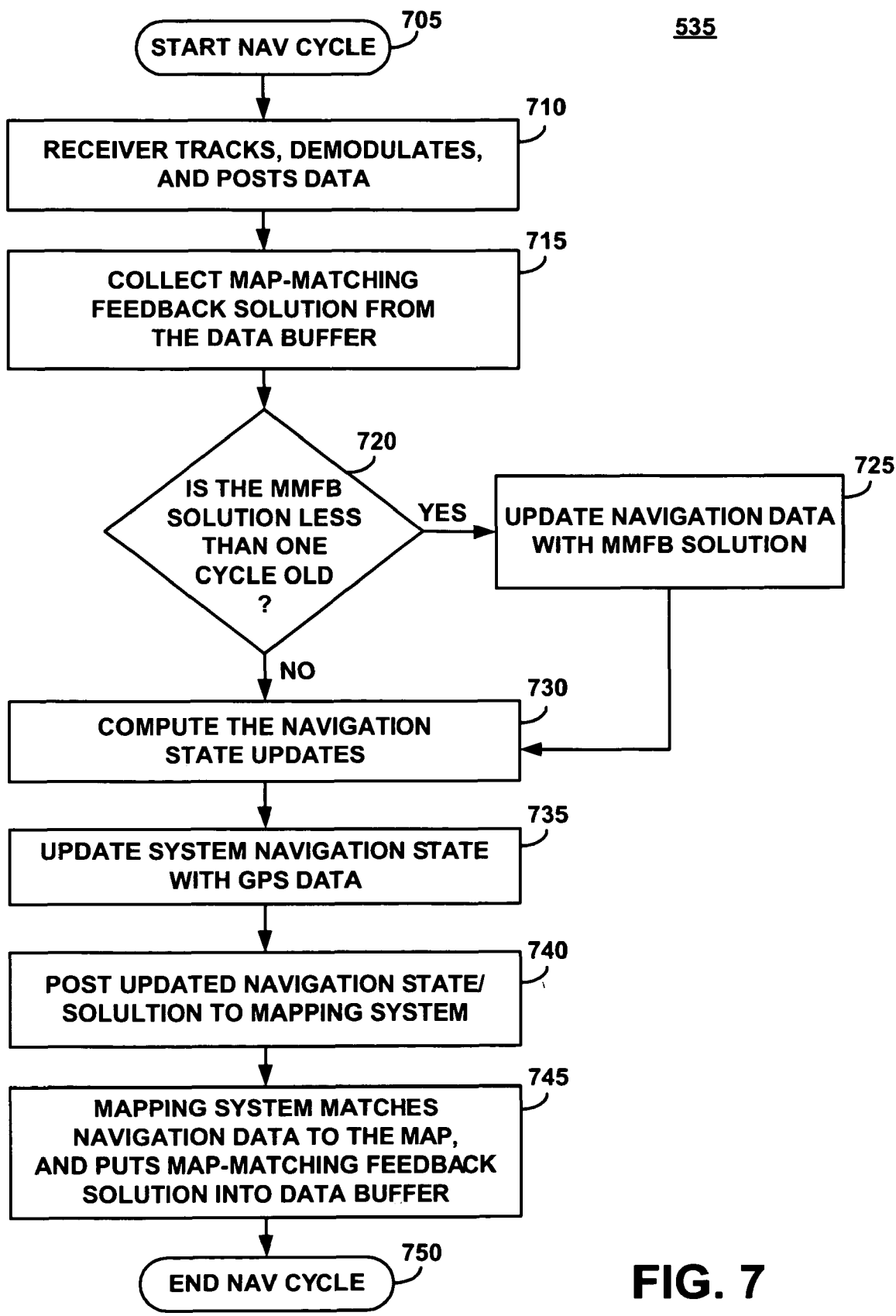
FIG. 7 is a process flow chart illustrating a more detailed method of operation of the map-matching feedback interface of FIG. 1 with a GPS input.

FIG. 7 illustrates a more detailed process flow chart representing a method of step 540 of FIG. 5 for an exemplary navigation system 100 using sensor data derived from a GPS system via GPS measurement engine 25. The navigation system 100 starts the navigation (NAV) cycle (step 705). At step 710, a GPS receiver in the GPS-based navigational system 20 tracks, demodulates, and posts data from the GPS satellite (not shown). The GPS navigation algorithm 20 collects the map-matching feedback solution 310 (further referenced herein as the MMFB solution 310Y from a data buffer in map-matching feedback interface 10 (step 715). The MMFB solution 310 comprises the map-matching feedback position, the map-matching feedback position header, the map-matching feedback heading, and the map-matching feedback heading error.

The GPS navigation algorithm 20 determines whether the MMFB solution 310 is appropriate for use by determining (at decision step 720) whether the MMFB solution 310 is less than one cycle old. If the MMFB solution 310 is less than one cycle old, map-matching feedback interface 10 has generated the MMFB solution 310 in the current cycle for use by the GPS navigation algorithm 20, and the GPS navigation algorithm 20 updates navigation data 305 with the MMFB solution 310 (step 725), such that:

position=map-matching feedback position heading=map-matching feedback heading

The GPS navigation algorithm 20 computes the navigation state updates (step 730), updating the navigation data 305 to determine a $\Delta$ position$_{GPS}$ and a $\Delta$ velocity$_{GPS}$. The GPS navigation algorithm 20 then updates the system navigation state with GPS data (step 735), creating the updated navigation solution:

velocity=velocity+$\Delta$velocity$_{GPS}$ heading=tan$^{-1}$(East Speed$_{GPS}$/North Speed$_{GPS}$)

heading rate=(heading−old heading)/$\Delta t$ old heading=heading position=position+$\Delta$position$_{GPS}$ The GPS navigation algorithm 20 posts the updated navigation solution to the mapping system 40 (step 740). The map-matching algorithm 50 within the mapping system 40 matches the navigation solution to a map in the map data 45 and produces a map-matched solution, which will become the map-matching feedback solution 310 when it is returned to the GPS navigation algorithm 20 via the map-matching feedback interface 10. The Map system 40 places the map-matching feedback solution 310 in the map-matching feedback interface 10 data buffer (step 745). The map-matching feedback solution comprises the map-matching feedback position, the map-matching feedback heading, the map-matching feedback position error, and the map-matching feedback header error. The navigation (NAV) cycle ends at step 750.

Figure 8A:
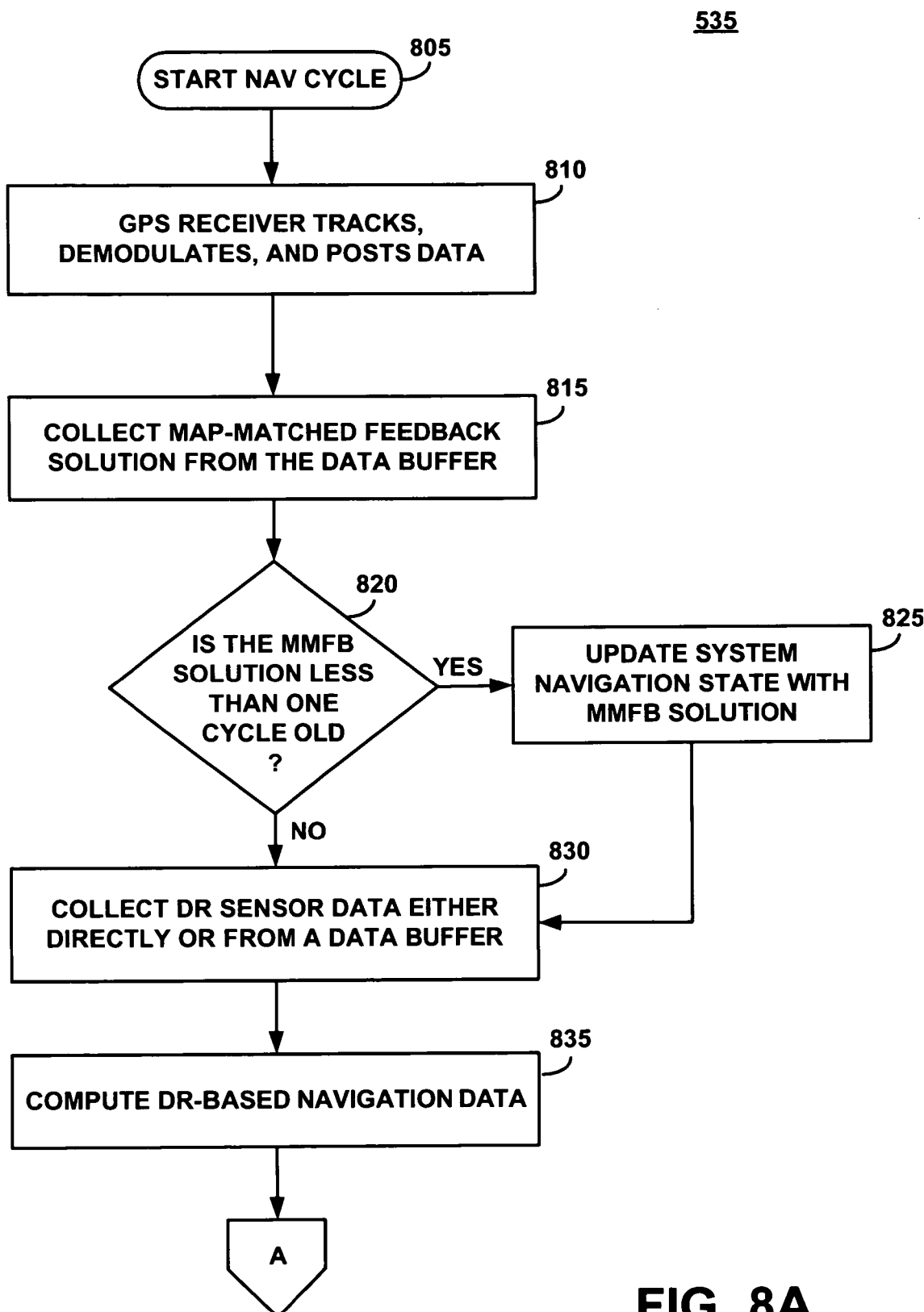
FIG. 8 is comprised of FIGS. 8A and 8B and represents a process flow chart illustrating a more detailed method of operation of the map-matching feedback interface of FIG. 1 with a GPS and a dead reckoning input.
Figure 8B:
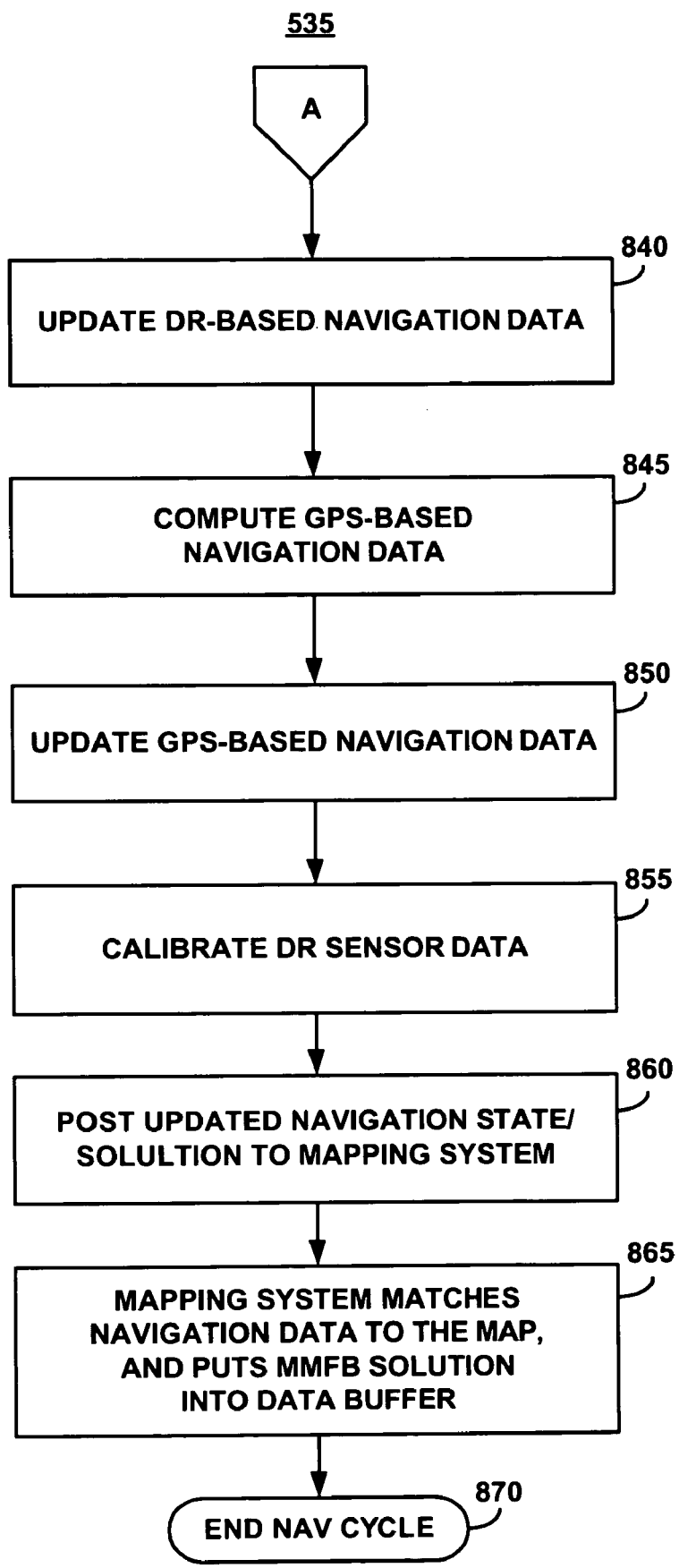

FIG. 8 (FIGS. 8A, 8B) illustrates a more detailed process flow chart representing a method of step 535 of FIG. 5 for an exemplary navigation system 100 using navigation data derived from a GPS system via GPS measurement engine 25 and optional DR sensors 35. The navigation system 100 starts the navigation (NAV) cycle (step 805). The GPS measurement engine 25 tracks, demodulates, and posts data from the GPS satellites (step 810). The GPS navigation algorithm 20 collects map-matching feedback solution 310 (further referenced herein as MMFB solution 310) from a data buffer in map-matching feedback interface 10 (step 815). The MMFB solution 310 comprises the map-matching feedback position, the map-matching feedback position header, the map-matching feedback heading, and the map-matching feedback heading error.

The GPS navigation algorithm 20 determines whether the MMFB solution 310 is appropriate for use by determining (at decision step 820) whether the MMFB solution 310 is less than a cycle old. If the MMFB solution 310 is less than a cycle old, map-matching feedback interface 10 has generated the MMFB solution 310 in the current cycle for use by the GPS navigation algorithm 20, and the GPS navigation algorithm 20 updates navigation data 305 with the MMFB solution 310 (step 825), such that:

position=map-matching feedback position heading=map-matching feedback heading

The GPS navigation algorithm 20 collects DR sensor data from the optional DR sensors 35 either directly or from a data buffer (step 830), creating the navigation data 305. The DR sensor data comprises velocity$_{DR}$, heading rate$_{DR}$, and heading. The mapping system computes the navigation data 305 from the DR sensor data, generating a DR-based navigation data (step 835) such that:

$\Delta$position$_{DR}$=velocity$_{DR}$/velocity cal*$\Delta t$ $\Delta$heading$_{DR}$=heading rate$_{DR}$/heading rate cal*$\Delta t$ where velocity cal is the current velocity calibration and heading rate cal is the current heading rate calibration.

The GPS navigation algorithm 20 updates the navigation state using DR-based navigation data (step 840). The updated navigation solution based on DR sensor data is:

velocity=velocity$_{DR}$ heading=tan$^{-1}$(East Speed$_{GPS}$/North Speed$_{GPS}$)

heading rate=(heading−old heading)/$\Delta t$ old heading=heading$_{GPS}$ position=position+$\Delta$position$_{GPS}$ The GPS navigation algorithm 20 computes the navigation data 305 from the GPS-based data (step 845), generating a GPS-based navigation data (step 850). The GPS navigation algorithm 20 calibrates DR sensor data (step 855) such that:

velocity cal=velocity$_{DR}$/velocity heading rate cal=heading rate$_{DR}$/heading.

The GPS navigation algorithm 20 posts the updated navigation solution to the mapping system 40 (step 860). The map-matching algorithm 50 within the mapping system 40 matches the navigation solution 305 to a map in the map data 45 and places the map-matching feedback solution 310 in the map-matching feedback interface 10 data buffer (step 865). The map-matching feedback solution comprises the map-matching feedback position, the map-matching feedback heading, the map-matching feedback position error, and the map-matching feedback header error. The navigation (NAV) cycle ends at step 870.

It will be further appreciated that the instructions represented by the operations in FIGS. 5, 7, and 8, and in other described operations provided herein, are not required to be performed in the order illustrated or described, and that all the processing represented by the operations may not be necessary to practice the invention. Further, the processes illustrated, or described can also be implemented in software stored in any one of or combinations of a RAM, a ROM, or a hard disk drive.

It is to be understood that the specific embodiments of the invention that have been described are merely illustrative of certain applications of the principle of the present invention. Numerous modifications may be made to the system and method for augmenting a satellite-based navigation solution described herein without departing from the spirit and scope of the present invention. Moreover, while the present invention is described for illustration purpose only in relation to GPS or DR, it should be clear that the invention is applicable as well to, for example, to any sensor that can provide a measurement of position, heading, or velocity to the present invention.

What is claimed is:

1. A method of augmenting a navigation solution of a navigation system for a platform, comprising:
within the navigation system, cyclically propagating a previous state for the platform into a current state for the platform over successive cycles, wherein the previous state includes any one or more of a previous position and a previous heading for the platform, and the current state includes any one or more of an initial position and an initial heading for the platform, and wherein at each cycle the resulting initial position and the initial heading become the previous position and the previous heading for a subsequent cycle;
wherein cyclically propagating within the navigation system includes:
processing satellite signals or dead-reckoning sensor signals to determine the current state from the previous state;
matching any one or more of the initial position and the initial heading from the current state to predetermined map data to determine any one or more of a map-matching feedback position and a map-matching feedback heading;
determining a relative accuracy between any one or more of the initial position and the initial heading and any one or more of the map-matching feedback position and the map-matching feedback heading; and
if the relative accuracy is within a limit, overwriting any one or more of the initial position and the initial heading with any one or more of the map-matching feedback position and the map-matching feedback heading based upon the relative accuracy to update the current state.

2. The method of claim 1, wherein the relative accuracy comprises anyone or more of a map-matching feedback position error and a map-matching feedback heading error.

3. The method of claim 2, wherein any one or more of the map-matching feedback position error and the map-matching feedback heading error are provided to the navigation system.

4. The method of claim 1, wherein each cycle extends for approximately 1 second.

5. The method of claim 1, wherein each cycle ranges between approximately 0.005 second and approximately 2 seconds.

6. The method of claim 1, wherein the navigation system comprises at least one sensor to detect a measurement from any one or more of a global positioning satellite system, a satellite positioning system, an inertial navigation system, and a dead reckoning system.

7. The method of claim 1, wherein any one or more of the initial position and the initial heading are matched to a predetermined mapping representation.

8. The method of claim 7, wherein the mapping representation comprises a digital mapping representation.

9. The method of claim 7, wherein the mapping representation is stored in a map database.

10. A navigation system capable of augmenting a navigation solution, comprising:
  a mapping system for matching any one or more of an initial position and an initial heading to predetermined map data to determine any one or more of a map-matching feedback position and a map-matching feedback heading;
  a receiver for processing satellite signals or dead-reckoning sensor signals so as to cyclically propagate a previous state for a platform into a current state for the platform over successive cycles, wherein the previous state includes any one or more of a previous position and a previous heading for the platform, and the current state includes any one or more of an initial position and an initial heading for the platform, and wherein at each cycle the resulting initial position and the initial heading become the previous position and the previous heading for a subsequent cycle, the receiver adapted for determining a relative accuracy between any one or more of the initial position and the initial heading and any one or more of the map-matching feedback position and the map-matching feedback heading;
  the receiver further adapted for selectively overwriting any one or more of the initial position and the initial heading with any one or more of the map-matching feedback position and the map-matching feedback heading if the relative accuracy is within a limit.

11. The navigation system of claim 10, wherein the relative accuracy comprises anyone or more of a map-matching feedback position error and a map-matching feedback heading error.

12. The navigation system of claim 11, wherein any one or more of the map-matching feedback position error and the map-matching feedback heading error are provided to the navigation system.

13. The navigation system of claim 10, wherein each cycle extends for approximately 1 second.

14. The navigation system of claim 10, wherein each cycle ranges between approximately 0.005 second and approximately 2 seconds.

15. The navigation system of claim 10, wherein the navigation system comprises at least one sensor to detect a measurement from any one or more of a global positioning satellite system, a satellite positioning system, an inertial navigation system, and a dead reckoning system.

16. The navigation system of claim 10, wherein any one or more of the initial position and the initial heading are matched to a predetermined mapping representation.

17. The navigation system of claim 16, wherein the mapping representation comprises a digital mapping representation.

18. The navigation system of claim 16, wherein the mapping representation is stored in a map database.

19. The navigation system of claim 10, wherein the receiver comprises a GPS receiver.

20. The navigation system of claim 10, wherein the mapping system and the receiver are remotely located.

* * * * *